US007881752B1

(12) United States Patent
Johnson et al.

(10) Patent No.: US 7,881,752 B1
(45) **Date of Patent: *Feb. 1, 2011**

(54) HYBRID ARCHITECTURE THAT COMBINES A METROPOLITAN-AREA NETWORK FIBER SYSTEM WITH A MULTI-LINK ANTENNA ARRAY

(75) Inventors: Harold W. Johnson, Roach, MO (US); Bruce E. Hoffman, Overland Park, KS (US); Walter F. Rausch, Shawnee, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1046 days.

This patent is subject to a terminal disclaimer.

(21) Appl. No.: 11/471,045

(22) Filed: Jun. 19, 2006

(51) Int. Cl.
*H04M 1/00* (2006.01)

(52) U.S. Cl. ................. 455/562.1; 455/561; 455/575.7; 379/56.2; 359/341.1; 359/341.2; 343/872; 343/873; 343/890; 343/892; 343/893; 370/334

(58) Field of Classification Search ............. 455/456.1, 455/13.3, 19, 25, 63.4, 561–562.1, 575.7; 359/341.1, 341.2; 379/56.2; 343/872–873, 343/890–893; 370/334
See application file for complete search history.

(56) References Cited

U.S. PATENT DOCUMENTS

| | | | |
|---|---|---|---|
| 5,884,166 A | | 3/1999 | Ray et al. |
| 5,898,904 A | | 4/1999 | Wang |
| 6,052,582 A | * | 4/2000 | Blasing et al. ........... 455/562.1 |
| 6,222,503 B1 | | 4/2001 | Gietema et al. |
| 6,640,100 B1 | * | 10/2003 | Kojima et al. ............ 455/426.2 |
| 6,947,008 B2 | | 9/2005 | Tillery et al. |
| 7,103,317 B2 | | 9/2006 | Chang et al. |
| 7,181,162 B2 | | 2/2007 | Chang et al. |
| 7,394,439 B1 | * | 7/2008 | Johnson et al. ............. 343/890 |
| 2002/0068612 A1 | * | 6/2002 | Carey et al. ................. 455/562 |
| 2002/0089451 A1 | * | 7/2002 | Wang et al. ................. 342/458 |
| 2006/0250311 A1 | * | 11/2006 | Bishop ........................ 343/702 |
| 2007/0091900 A1 | * | 4/2007 | Asthana et al. ........ 370/395.42 |
| 2008/0062062 A1 | * | 3/2008 | Borau et al. ................ 343/844 |
| 2009/0009391 A1 | * | 1/2009 | Fox et al. ..................... 342/372 |
| 2009/0109902 A1 | * | 4/2009 | Axnas et al. ................ 370/328 |

OTHER PUBLICATIONS

Wikipedia, Metropolitan Area Network, Wikipedia, 3.*
Wikipedia, Phased Array, Wikipedia, 13 pages.*

* cited by examiner

*Primary Examiner*—Munsoon Choo
*Assistant Examiner*—Kamran Afshar

(57) ABSTRACT

A system and method for utilizing a multi link antenna array for wireless links in conjunction with fiber MAN's is disclosed. The fiber MAN's are coupled to one or more multi-link antenna arrays. Each multi-link antenna array forms a plurality of point-to-point wireless links.

18 Claims, 3 Drawing Sheets

HYBRID ARCHITECTURE THAT COMBINES A METROPOLITAN-AREA NETWORK FIBER SYSTEM WITH A MULTI-LINK ANTENNA ARRAY

RELATED APPLICATIONS

This application is related to the application "Multi-link antenna array that conforms to cellular leasing agreements for only one attachment fee" and "Multi-link antenna array configured for cellular site placement" that were filed on the same day as the current application and are hereby incorporated by reference.

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication architectures.

2. Description of the Prior Art

Metropolitan Area Network (MAN) based fiber optical transmission presently exists as transport and for last mile access. Fiber MAN's can also use twisted pair access loops, fixed wireless point to point, point to multi point microwave and millimeter wave wireless links as last mile access but presently do not incorporate point to point wireless links using common carrier bands for last mile access. Patch antennas are common for many bands but not available or certified for common carrier bands such as 2, 4, and 6 GHz Common carrier point to point MW bands. Using point to multi point wireless links combined with MAN fiber optical transmission result in transmission delay in the order of 4 ms or more, end to end, per 125 miles. In addition, networks using point to multi point wireless or Ethernet over fiber transmission based on Ethernet switches or routers are examples of transmission network architectures where capacity is shared between sites, links, circuits and users, creating a less secure, more vulnerable network exposed to unauthorized intrusion.

Common carrier bands at 2, 4 and 6 GHz, especially the 4 GHz band, are under utilized today. The original and primary use of the bands was for long distance telecommunication across the US. The long distance links where typically operated by AT&T, MCI and other telephone companies. The long distance RF links had link distances of 30 miles or more. These long distance links require large antennas. These antennas had to be mounted individually on structures and cell towers. The leasing cost on cell towers is based, in part, on the number of mountings used. The large microwave antennas also created wind loading problems on cell towers. Today these companies and new operators typically utilize fiber optical transcontinental networks for Long Distance telecommunications. Deployment of fiber networks has rendered the 4 GHz band as highly under utilized and available for other uses.

Therefore there is a need for a system and method that utilizes these common carrier bands for last mile access on fiber MAN's.

SUMMARY OF THE INVENTION

A system and method for utilizing a multi link antenna array for wireless links in conjunction with fiber MAN's is disclosed. The fiber MAN's are coupled to one or more multi-link antenna arrays. Each multi-link antenna arrays forms a plurality of point-to-point wireless links.

DETAILED DESCRIPTION OF THE PREFERRED EMBODIMENT

Figure 1:
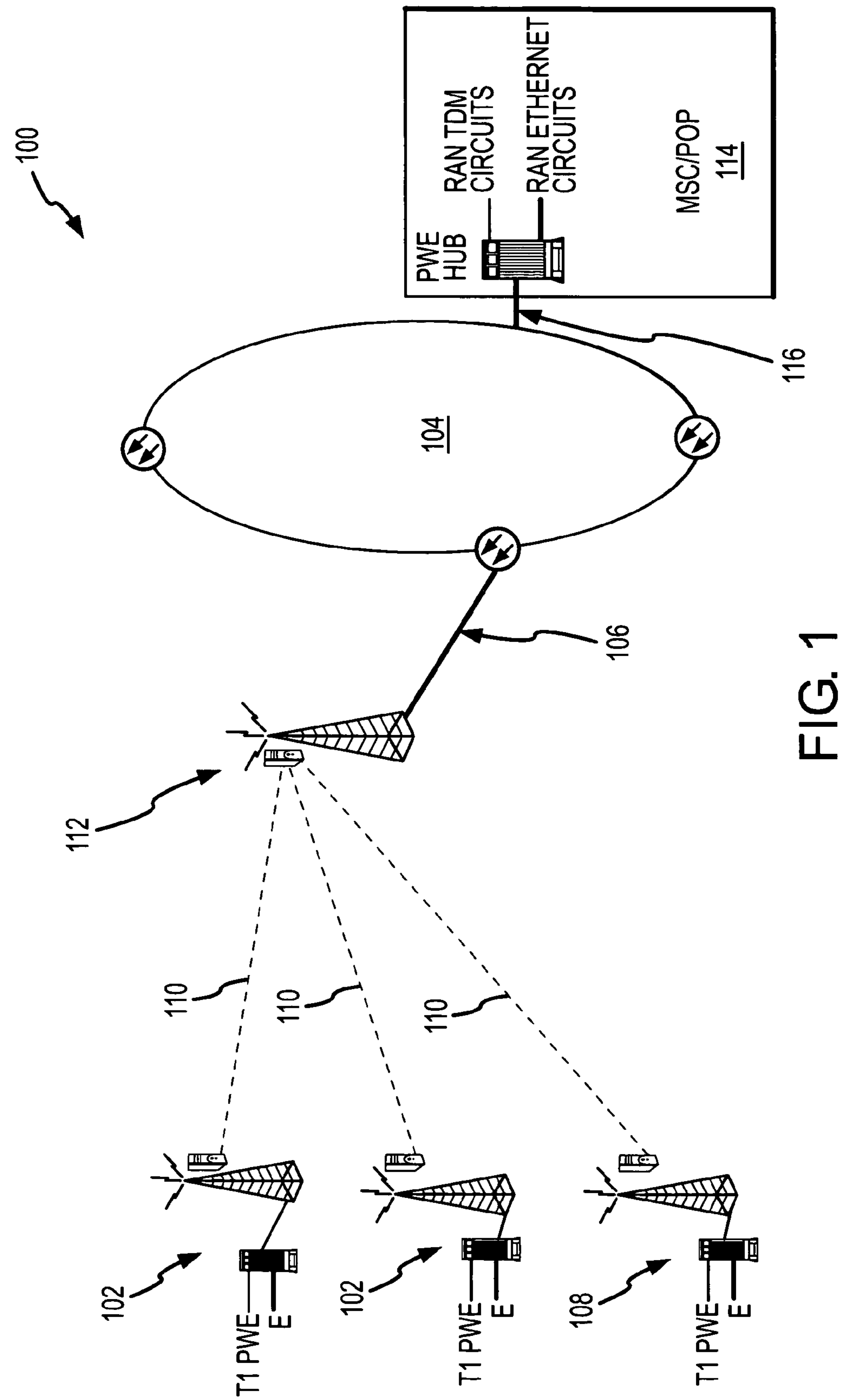
FIG. 1 is a block diagram of a communication system 100 in an example embodiment of the invention.
Figure 2:
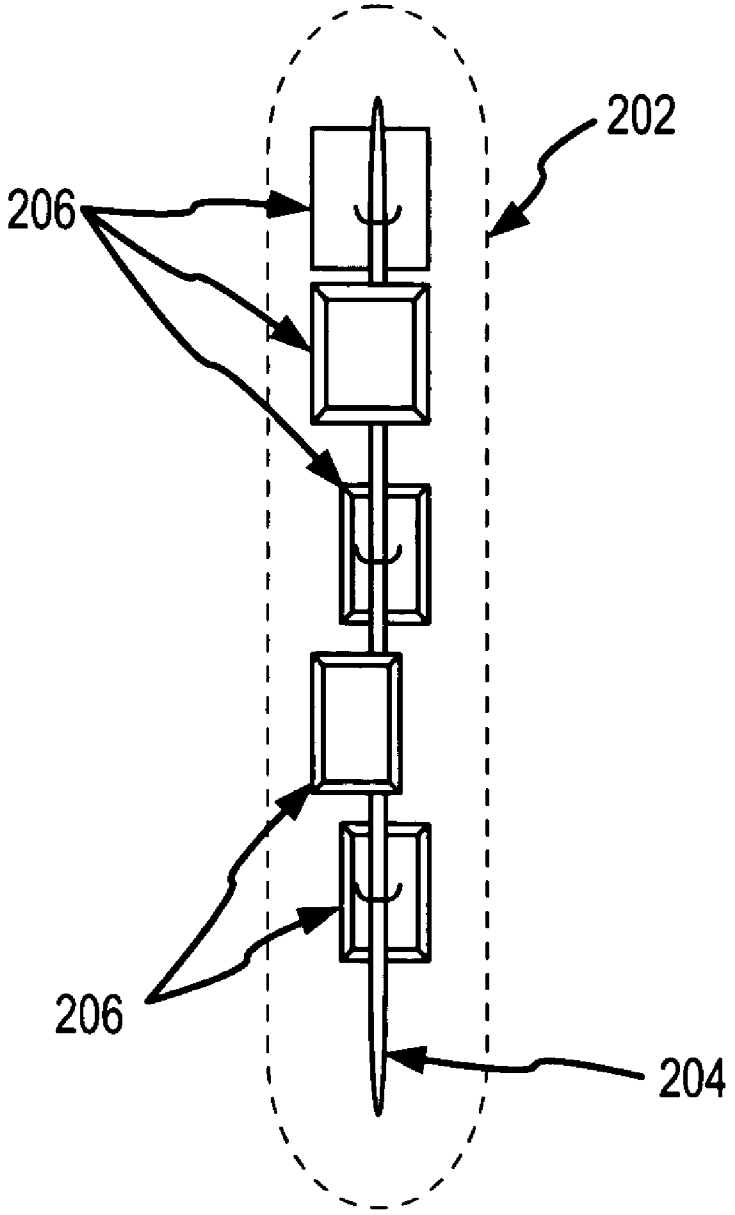
FIG. 2 is a cutaway diagram of a multi-link antenna array in an example embodiment of the invention.
Figure 3:
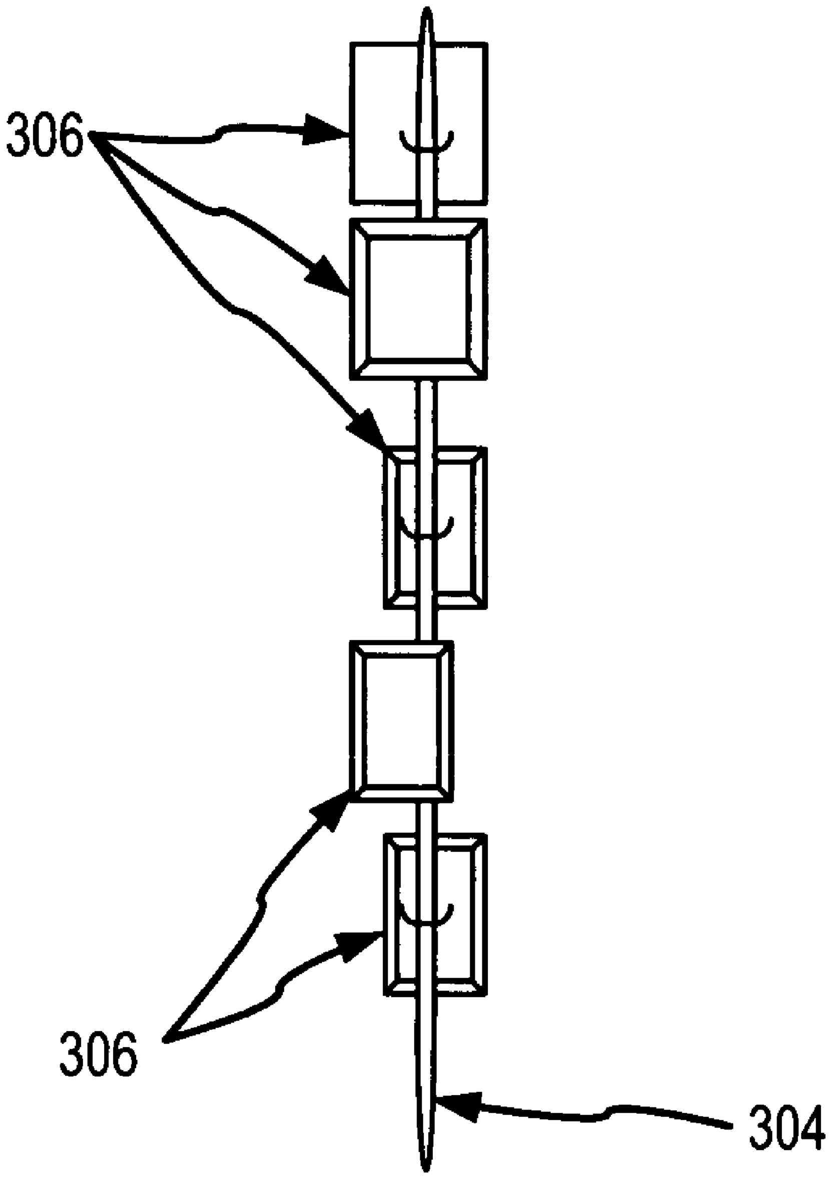
FIG. 3 is a cutaway diagram of a multi-link antenna array in another example embodiment of the invention.

FIGS. 1-3 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Metropolitan Area Networks (MANs) have been constructed to interconnect the local telephone switches and the long distance telephone switch over fiber optic links. The MAN includes Synchronous Optical Network (SONET) equipment and Wave Division Multiplexing (WDM) equipment that is typically located at the local telephone switch sites. Fiber MAN's may use twisted pair access loops, fixed wireless point to point, point to multi point microwave and millimeter wave wireless links as last mile access. In one embodiment of the current invention, a fiber MAN uses a plurality of point-to-point microwave links from a multi link antenna array site to provide last mile access. By combining the performance attributes of the MAN's high capacity fiber transmission with point to point fixed wireless links, the result is secure and very low delay communication transmissions. The architecture of the current invention enables end to end millisecond transmission delay for circuits and services transported. End to end transmission delay performance that will result with this architecture will be on the order of 1 msec. per 125 miles.

FIG. 1 is a block diagram of a communication system 100 in an example embodiment of the invention. Communication system 100 comprises a plurality of regional area network (RAN) sites 102, a fiber MAN 104, a multi-link antenna array site 112, a customer site 108 and a mobile switching center point of presence (MSC/POP) 114. MAN 104 is coupled to MSC/POP 114 with a fiber link 116. Multi-link antenna array site 112 is coupled to MAN 104 with a fiber link 106. In one example embodiment of the invention, fiber link 106 may support multiple protocols, for example TDM and Ethernet. The plurality of RAN sites 102 are coupled to the multi-link antenna array site 112 with point-to-point wireless microwave (MW) links 110. The customer site 108 is coupled to the multi-link antenna array site 112 with a point-to-point wireless MW link 110. In one example embodiment of the invention, the point-to-point microwave links operate over the common carrier bands. Common carrier bands typically operate at 2, 4, 6, 10, 11, 18, 23, and 28 GHz.

FIG. 2 is a cutaway diagram of a multi-link antenna array in an example embodiment of the invention. Multi-link antenna array comprises a radome enclosure 202, an antenna mounting system 204 and a plurality of antennas 206. The radome enclosure 202 is configured to match the size and shape of the cellular antenna elements mounted onto a cell tower. Radome enclosure 202 may be any suitable shape, such as cylinder, rectangle, or the like. Radome enclosure 202 is also configured to mount to the antenna mounting system of a cell tower or a building site using the same mounting system used by the cellular antenna elements. Radome enclosure 202 is configured to resemble any one of the possible cellular antenna elements. Typical cellular antenna elements come in a number of shapes and sizes. One typical cellular antenna element is a cylindrical tube with rounded ends. The cylindrical tube is typically 10 to 16 inches in diameter and typically 6 feet in length. The cylindrical tube is typically mounted with a vertical orientation (as shown in FIG. 1). Another typical cellular antenna element is generally rectangular in shape. The generally rectangular shape may have rounded edges or chamfered edges. The generally rectangular shape is typically 10 to 14 inches in depth and width and approximately 6 feet in length. The dimensions given above for the sizes of a typical cellular antenna element are for illustration only. Other cellular antenna element sizes are possible. The example dimensions do not limit the radome size of the current invention.

In one example embodiment of the invention, the antenna mounting system 204 is a vertical post fixed inside the radome enclosure 202. The plurality of antennas 206 are mounted along the vertical post. The vertical post allows the plurality of antennas 206 to be aimed over the full 360 degree azimuth range. Other antenna mounting systems that allow the full 360 degree azimuth range are possible and include a series of horizontal slots built into the radome enclosure, where each antenna mounts to the radome using one or more slots, a series of stackable disks, where each disk contains one antenna and where the disks can be rotated on top of each other, or the like. In another example embodiment of the invention, the antenna mounting system may limit the aim of the antennas to a subset of the full 360 degree azimuth range.

In one example embodiment of the invention, each of the plurality of antennas 206 is configured to operate at one of the common carrier bands, for example the 2, 4, 6, 10, 11, 18, 23, or 28 GHz band. When operating at one of the common carrier bands, antenna 206 may be a small patch antenna. Using a small sized patch antenna that fits into the form factor of the radome enclosure 202 may still allow an effective range of up to 10 miles for some of the common carrier bands. The small patch antennas handle all weather conditions without link path failures and operates through foliage albeit with some reduction in range when operating at the 2, 4, or 6 GHz frequencies. The higher frequency common carrier bands (10-28 GHz) may have a reduction in link distance and less tolerance for adverse weather conditions using the small patch antennas. Patch antennas are common for many bands but there are currently no commercially available certified small form factor patch type directional antennas that can be used with common carrier bands such as the 2, 4, 6, 10, 11, 18, 23, and 28 GHz common carrier point to point microwave (MW) bands. Matching a patch antenna to a given wavelength band is well known in the arts.

One of the costs for utilizing cellular towers is the number of cables or wires that run up the tower. In one example embodiment of the invention, the signal lines for each of the plurality of antennas mounted inside the radome enclosure are bundled into one cable that exits the radome. The cable may also include a power lead, a ground path, control lines or the like.

In one example embodiment of the invention, each of the plurality of antennas mounted inside the radome include a radio frequency (RF) head. The RF head converts an intermediate frequency (IF) into the actual frequency used by the antenna. In this way an IF signal can be sent up the tower and into the radome enclosure, instead of the RF signal. The signal lines used to transmit IF signals are typically smaller than lines designed to carry microwave RF signals. By bundling all the signal lines, and possibly the power line, ground path, and control lines into only one cable, the cost under the current cellular lease agreements may be minimized.

In one example embodiment of the invention, all the antennas inside a radome enclosure would be similar and would operate at essentially the same wavelength. In another example embodiment of the invention, a variety of different antennas, operating over a wide range of frequencies, would be mounted inside one radome enclosure. The variety of antenna types include: small patch type antennas, yagi antennas, parabolic antennas, circular polarizing elements, and the like. The multi-link antenna array may operate at one of, or a combination of, the following carrier bands: common carrier bands of 4, 6, 10, 11, 18, 23, 28 GHz; unlicensed bands ISM 2.4, UNII 5.8, 3.6 GHz; E-band 71-91 GHz and auctioned carrier bands applicable with PTP (point to point) radio's: 700, 800, 1900 MHz, broadband radio service (BRS) 2.5 GHz and all LMDS bands (28 GHz through 39 GHz), Millimeter Wave radio bands, or any frequency where point to point microwave and millimeter wave radio's are authorized to operate. One or more multi-link antenna arrays may be mounted onto a cellular tower, depending on the number of point-to-point links required at that site.

The multi-link antenna array of the current invention enables multiple point to point links to be supported from a single enclosure on a cell tower antenna mounting system or building mounting system. The small sized antennas permit the use of existing common carrier bands, such as the 4 GHz band, as cell site backhaul links. The common enclosure holding multiple antennas avoids the high leasing costs associated with mounting individual antennas. The individual antenna rotary mounting provides support of multiple microwave paths having full azimuth range of MW link propagation from a single host array and tower mounting.

Using the common carrier bands creates a lower one-way transmission delay than point to multi-point fixed wireless system or mesh wireless topologies. Transmission delay and differential delay for cell site backhaul are a particular challenge, especially as they relate to CDMA soft hand-offs and the ongoing migration to all IP end to end transmission for cellular originated and/or terminated traffic. In one example embodiment of the invention, the RF modems per link may also be incorporated into each antenna to improve S/N (signal to noise margin) and further increase link ranges.

FIG. 3 is a cutaway diagram of a multi-link antenna array in another example embodiment of the invention. Multi-link antenna array comprises an antenna mounting system 304 and a plurality of antennas 306. Multi-link antenna array does not contain a radome, but the plurality of antennas 306 are configured to fit inside the same size and shape as the cellular antenna elements mounted onto the cell tower. The antenna mounting system 304 is configured to mount to the antenna mounting system of a cell tower or antenna mounting system on a building site using the same mounting system used by the cellular antenna elements. Because the plurality of antennas 306 fit within the size of a cellular antenna element, and the multi-link antenna array mounts to a cell tower or building site using the space equivalent to one cellular antenna element, the multi-link antenna array may qualify as a single attachment to the cellular tower under the leasing agreement. This avoids the high leasing costs associated with mounting each antenna in the antenna array onto the cellular tower as an individual antenna element.

We claim:

1. A communication system, comprising:

a multi link antenna array site, wherein the multi link antenna array site comprises:

a radome enclosure with an outer size and shape that matches the outer size and shape of a cellular antenna element, a radome mounting system coupled to the radome enclosure and attached to a cellular antenna element mounting system external to the radome enclosure, wherein the cellular antenna element mounting system is configured to mount the cellular antenna element to a cell site structure, an antenna mounting system configured to mount a plurality of antennas completely inside the radome enclosure, and a plurality of antennas mounted to the antenna mounting system, wherein each of the plurality of antennas comprise an antenna element and a radio frequency (RF) head configured to convert an intermediate frequency (IF) signal into a frequency for use by the antenna element;

a single cable configured to enter the radome enclosure and carry the IF signals, a power line, and a ground path for the plurality of antennas;

a plurality of remote sites coupled to the multi link antenna array site with a plurality of point to point microwave links; and a fiber Metropolitan area network (MAN) coupled to the multi link antenna array site.

2. The communication system of claim 1 where the multi link antenna array site further comprises:

a plurality of patch antennas where each of the plurality of patch antennas form one end of the plurality of point to point microwave links and the plurality of patch antennas are mounted on a common mount.

3. The communication system of claim 2 where the plurality of patch antennas are each smaller than two feet in width.

4. The communication system of claim 1 where the plurality of point to point microwave links operate using a common carrier band selected from the 2, 4, 6, 10, 11, 18, 23, or 28 GHz common carrier bands.

5. The communication system of claim 1 where at least one of the plurality of remote sites is a regional area network (RAN) site.

6. The communication system of claim 1 where at least one of the plurality of remote sites is a customer site.

7. The communication system of claim 1 where at least one of the plurality of point to point microwave links is used as a backhaul link.

8. The communication system of claim 1 where the fiber MAN is coupled to the multi link antenna array site with an optical link.

9. The communication system of claim 1 where at least one of the plurality of antennas operates at a wavelength band selected from the group: broadband radio service (BRS) 2.5 GHz, local multipoint distribution service (LMDS 24 GHz-39 GHz), Unlicensed bands 2.4 GHz, 3.6 GHz, 5.8 GHz, or at licensed cellular bands 800 MHz, 1900 MHz.

10. A method of operating a communication system, comprising:

coupling a fiber Metropolitan area network (MAN) to a multi link antenna array site;

coupling the multi link antenna array site to a plurality of remote sites with a plurality of point to point microwave links; and forming the multi link antenna array site by enclosing a plurality of antennas inside a radome enclosure, wherein the radome enclosure has an outer size and shape that matches the outer size and shape of a cellular antenna element, wherein the plurality of antennas form the plurality of point to point microwave links, and wherein each of the plurality of antennas comprise an antenna element and a radio frequency (RF) head configured to convert an intermediate frequency (IF) signal into a frequency for use by the antenna element; and feeding the plurality of antennas with a single cable configured to enter the radome enclosure and carry the IF signals, a power line, and a ground path.

11. The method of operating a communication system of claim 10 where the plurality of point to point microwave links operate using a common carrier band selected from the 2, 4, 6, 10, 11, 18, 23, or 28 GHz common carrier bands.

12. The method of operating a communication system of claim 10 where at least one of the plurality of remote sites is a regional area network (RAN) site.

13. The method of operating a communication system of claim 10 where at least one of the plurality of remote sites is a customer site.

14. The method of operating a communication system of claim 10 where at least one of the plurality of point to point microwave links is used as a backhaul link.

15. The method of operating a communication system of claim 10 where the fiber MAN is coupled to the multi link antenna array site with an optical link.

16. The method of operating a communication system of claim 10 where at least one of the plurality of point to point microwave links operates at a wavelength band selected from the group: broadband radio service (BRS) 2.5 GHz, local multipoint distribution service (LMDS 24 GHz-39 GHz), Unlicensed bands 2.4 GHz, 3.6 GHz, 5.8 GHz, or at licensed cellular bands 800 MHz, 1900 MHz.

17. A communication system, comprising:

a multi link antenna array site, wherein the multi link antenna array site comprises a plurality of patch antennas where each of the plurality of patch antennas form one end of the plurality of point to point microwave links and the plurality of patch antennas are mounted on a common mount;

a plurality of remote sites coupled to the multi link antenna array site with a plurality of point to point microwave links;

a fiber Metropolitan area network (MAN) coupled to the multi link antenna array site;

wherein the multi link antenna array site further comprises:

a radome enclosure with an outer size and shape that matches the outer size and shape of a cellular antenna element;

a radome mounting system coupled to the radome enclosure and attached to a cellular antenna element mounting system external to the radome enclosure, wherein the cellular antenna element mounting system is configured to mount the cellular antenna element to a cell site structure;

an antenna mounting system configured to mount the plurality of patch antennas completely inside the radome enclosure;

a plurality of antennas mounted to the antenna mounting system, wherein each of the plurality of antennas comprise an antenna element and a radio frequency (RF) head configured to convert an intermediate frequency (IF) signal into a frequency for use by the antenna element; and a single cable configured to enter the radome enclosure and carry the IF signals, a power line, and a ground path for the plurality of antennas.

18. The communication system of claim 17, wherein the plurality of point to point microwave links operate using a common carrier band selected from the 2, 4, 6, 10, 11, 18, 23, or 28 GHz common carrier bands.

* * * * *